United States Patent
Nakazawa et al.

(10) Patent No.: US 9,550,659 B2
(45) Date of Patent: Jan. 24, 2017

(54) BATTERY POWERED WORK MACHINE, AND BATTERY POWERED FORKLIFT

(71) Applicant: Komatsu Ltd., Tokyo (JP)

(72) Inventors: Norikazu Nakazawa, Oyama (JP); Kouji Nishiyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/990,514

(22) PCT Filed: Jan. 8, 2013

(86) PCT No.: PCT/JP2013/050123
§ 371 (c)(1),
(2) Date: May 30, 2013

(87) PCT Pub. No.: WO2014/109001
PCT Pub. Date: Jul. 17, 2014

(65) Prior Publication Data
US 2015/0375977 A1    Dec. 31, 2015

(51) Int. Cl.
*B66F 9/075*    (2006.01)
*B60L 11/18*    (2006.01)
(Continued)

(52) U.S. Cl.
CPC .............. *B66F 9/07531* (2013.01); *B60K 1/00* (2013.01); *B60K 1/04* (2013.01); *B60L 11/18* (2013.01);
(Continued)

(58) Field of Classification Search
CPC ... B66F 9/075; B66F 9/07531; B66F 9/07536; B66F 9/0754; B66S 5/06; B60L 11/1805; B60L 11/1812
See application file for complete search history.

(56) References Cited

U.S. PATENT DOCUMENTS

| | | |
|---|---|---|
| 3,217,825 A | 11/1965 | Hauxwell et al. |
| 5,114,207 A | 5/1992 | Nakajima et al. |
| (Continued) | | |

FOREIGN PATENT DOCUMENTS

| | | |
|---|---|---|
| CH | 401829 A | 10/1965 |
| CN | 1601001 A | 3/2005 |
| (Continued) | | |

OTHER PUBLICATIONS

International Search Report mailed Feb. 12, 2013, issued for PCT/JP2013/050123.
(Continued)

*Primary Examiner* — William A Rivera
*Assistant Examiner* — Stefan Kruer
(74) *Attorney, Agent, or Firm* — Locke Lord LLP

(57) ABSTRACT

A battery-powered work machine driven with a battery, includes: a body including a bottom and a pair of sides erecting from the bottom and including a first side and a second side; a control device of the work machine mounted on the bottom; a first fuse for a driving control device and a second fuse for a cargo-handling device, provided closer to the first side than the second side; a charging device for the battery, the charging device being mounted on the bottom; and a third fuse for the charging device, provided closer to the second side than the first side.

5 Claims, 8 Drawing Sheets

(51) Int. Cl.
*B60K 1/04* (2006.01)
*B60K 1/00* (2006.01)
*B66F 9/07* (2006.01)
*B60S 5/06* (2006.01)

(52) U.S. Cl.
CPC ............ *B60L 11/1809* (2013.01); *B66F 9/07* (2013.01); *B66F 9/07504* (2013.01); *B60K 2001/003* (2013.01); *B60K 2001/0416* (2013.01); *B60Y 2200/62* (2013.01)

(56) References Cited

U.S. PATENT DOCUMENTS

| | | | | |
|---|---|---|---|---|
| 5,297,645 | A * | 3/1994 | Eckersley et al. | 180/68.5 |
| 5,360,307 | A * | 11/1994 | Schemm et al. | 414/343 |
| 5,585,205 | A * | 12/1996 | Kohchi | 429/99 |
| 5,760,569 | A * | 6/1998 | Chase, Jr. | 320/104 |
| 6,189,636 | B1 * | 2/2001 | Kikukawa | 180/68.5 |
| 7,216,734 | B2 | 5/2007 | Fujii | |
| 7,377,346 | B2 | 5/2008 | Fujii | |
| 8,113,311 | B2 * | 2/2012 | Herrmann et al. | 180/68.5 |
| 9,216,882 | B2 * | 12/2015 | Nakazawa | B66F 9/075 |
| 2002/0189874 | A1 * | 12/2002 | Sato | B60R 16/0239 180/65.8 |
| 2004/0100225 | A1 * | 5/2004 | Neil | B60L 1/003 320/109 |
| 2004/0129466 | A1 * | 7/2004 | Leifert | B60K 1/04 180/65.25 |
| 2012/0286541 | A1 | 11/2012 | Kashiwagi | |
| 2015/0050530 | A1 * | 2/2015 | Seimiya | H01M 2/1077 429/61 |

FOREIGN PATENT DOCUMENTS

| | | | |
|---|---|---|---|
| CN | 102774430 A | 11/2012 | |
| DE | 10013079 A1 | 9/2001 | |
| DE | 102008004653 A1 | 4/2009 | |
| EP | 2119586 A2 * | 11/2009 | ............... B60K 6/48 |
| GB | 2454067 A | 4/2009 | |
| JP | 05-286700 A | 11/1993 | |
| JP | 07-213560 A | 8/1995 | |
| JP | 08-026046 A | 1/1996 | |
| JP | 11-292488 A | 10/1999 | |
| JP | 2001-019379 A | 1/2001 | |
| JP | 2001-130885 A | 5/2001 | |
| JP | 2005-096631 A | 4/2005 | |
| JP | 2006-069357 A | 3/2006 | |
| JP | 2012-232705 A | 11/2012 | |

OTHER PUBLICATIONS

Office Action dated Oct. 6, 2015, issued for the corresponding German Patent Application No. 11 2013 000 389.9 and English translation thereof.

* cited by examiner

BATTERY POWERED WORK MACHINE, AND BATTERY POWERED FORKLIFT

FIELD

The present invention relates to a battery powered work machine, and a battery powered forklift.

BACKGROUND

As a battery powered work machine, there has been known a forklift that loads and unloads cargo and moves the cargo by using a fork mounted on the front part of the body of the machine. The forklift described above travels and performs a cargo handling operation with a battery mounted on the body (see, for example, Patent Literature 1).

CITATION LIST

Patent Literature

Patent Literature 1: Japanese Laid-open Patent Publication No. 2001-130885

SUMMARY

Technical Problem

The battery powered work machine includes a control device for controlling an electric motor for work and for controlling an electric motor for driving the work machine, and a charging device for charging the battery. A fuse is provided for these devices for safety reasons. It is preferable that the fuse can easily be maintained. Patent Literature 1 has neither description nor suggestion about the maintenance of the fuse. Therefore, this point has to be improved.

The present invention aims to easily make a maintenance process of a fuse in a battery powered work machine.

Solution to Problem

According to the present invention, a battery powered work machine driven with a battery, comprises: a body including a bottom and a pair of sides erecting from the bottom; a control device of the work machine mounted on the bottom close to one of the sides; a fuse for the control device, the fuse being provided to be opposite to the one of the sides; a charging device for the battery, the charging device being mounted on the bottom close to the other one of the sides; and a fuse for the charging device, the fuse being provided to be opposite to the other one of the sides.

In the present invention, it is preferable that the one of the sides includes a first opening on at least a position opposite to the fuse for the control device, and the other one of the sides includes a second opening on at least a position opposite to the fuse for the charging device.

A battery powered forklift including a fork mounted on a front of a body to which a front wheel and a rear wheel are attached, a counter weight provided on a rear of the body, and a driving electric motor that allows the body to travel, the forklift comprises: a battery mounted on the body above the rear wheel; a storage space that is formed in the body, below a bottom of the battery, and above a bottom of the body, and in which a pair of body sides are erected from both sides of the bottom in a widthwise direction of the body; a control device mounted in the storage space to be close to one of the sides for controlling the driving electric motor; a fuse for the control device, the fuse being stored in the storage space, and is provided to be opposite to the one of the sides; a charging device mounted close to the other side of the sides in the storage space for charging the battery; a fuse for the charging device, the fuse being stored in the storage space, and is provided to be opposite to the other side of the sides; a cargo-handling electric motor that is stored in the storage space for allowing operating oil, which operates the fork, to generate oil pressure; and an operating oil tank that is stored in the storage space for holding the operating oil, wherein the control device controls the cargo-handling electric motor.

In the present invention, it is preferable that the one of the sides includes a first opening on at least a position opposite to the fuse for the control device, and the other one of the sides includes a second opening on at least a position opposite to the fuse for the charging device.

In the present invention, it is preferable that the battery powered forklift further comprises a fan that exhausts air in the storage space to an outside.

Advantageous Effects of Invention

The present invention can realize that a maintenance process of a fuse can easily be done in a battery powered work machine.

DESCRIPTION OF EMBODIMENTS

The embodiments of the present invention will be described in detail with reference to the drawings.

Figure 1:
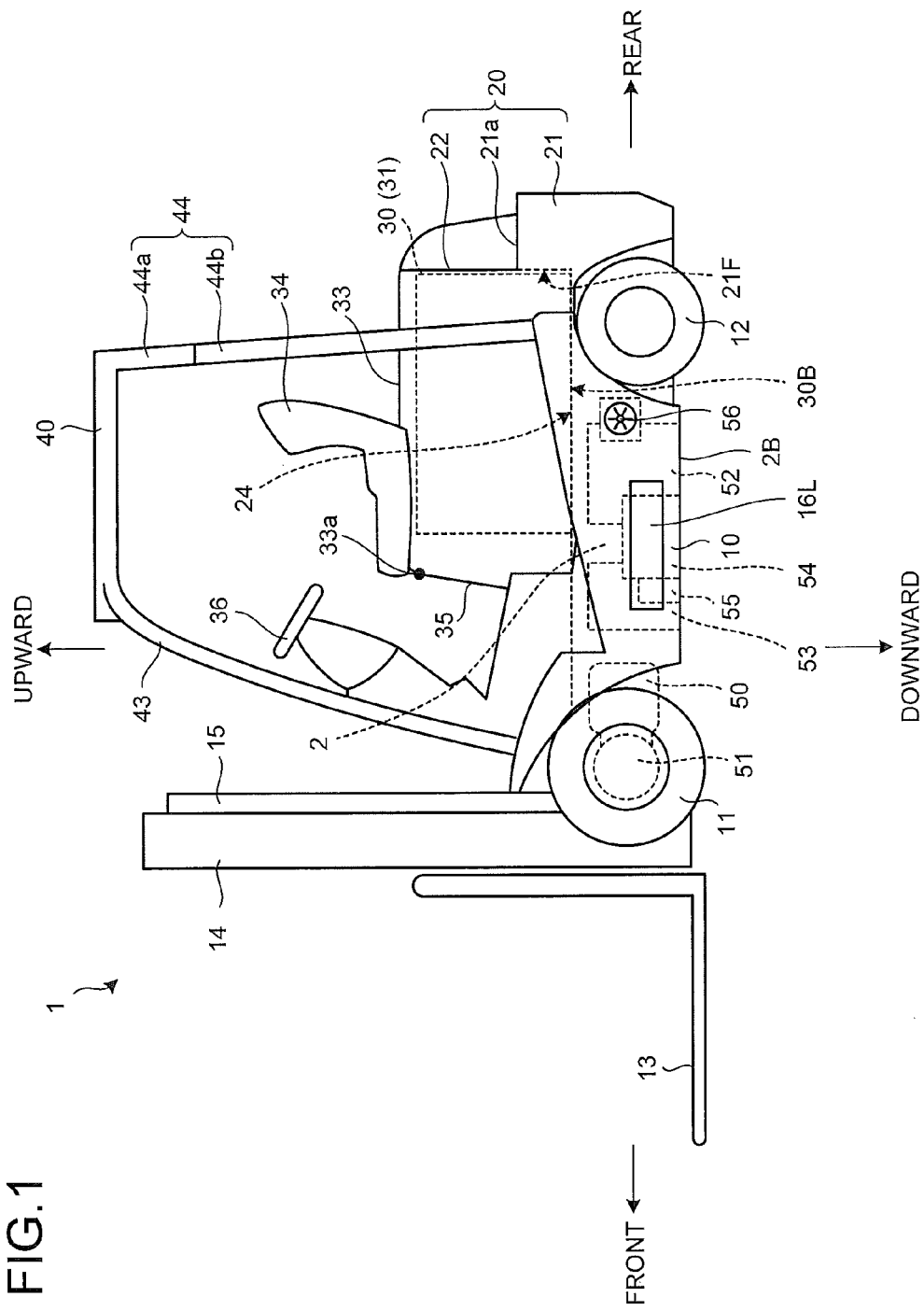
FIG. 1 is a side view illustrating a work machine according to an embodiment of the present invention viewed from left.
Figure 2:
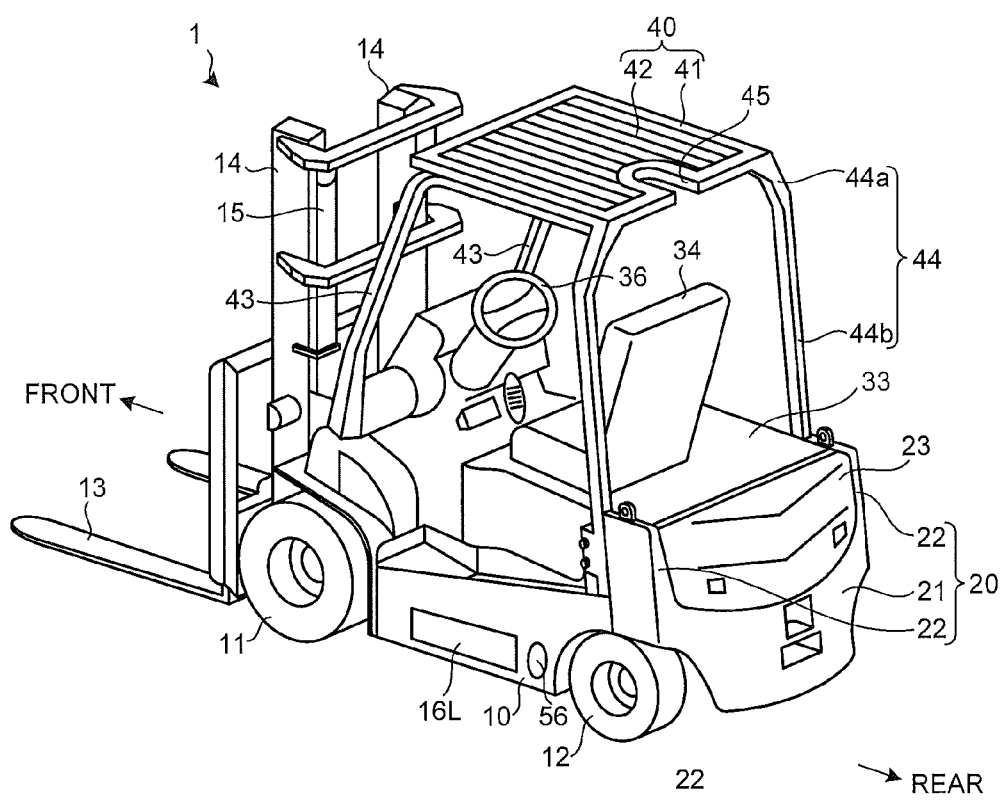
FIG. 2 is a perspective view illustrating the work machine according to the embodiment of the present invention viewed from obliquely above on left rear part.

FIG. 1 is a side view illustrating a work machine according to an embodiment of the present invention viewed from left. FIG. 2 is a perspective view illustrating the work machine according to the embodiment of the present invention viewed from obliquely above on left rear part. A battery powered forklift 1 will be described below as the battery powered work machine in the present embodiment. However, the work machine is not limited thereto. For example, the work machine may be a wheel loader or an excavator that is driven by power from a battery or power supplied from a generator driven by an engine or the like.

In the description below, the side where a fork 13 is provided is a front side, while the side where a counter weight 20 is provided is a rear side in the battery powered forklift 1. When the work machine is not the battery powered forklift, the direction toward a steering wheel 36 serving as an operation device from a driver seat 34 is a front direction, while the direction toward the driver seat 34 from the steering wheel 36 is a rear direction. The operation device includes not only the steering wheel 36 used for steering the work machine, but also an operation lever for operating the work machine in an excavator or a wheel loader.

In the present embodiment, right and left are supposed to mean right and left with respect to the front. The lateral direction is a widthwise direction of a body 10 serving as a body of the work machine. The upward direction is a direction orthogonal to a plane (contact plane) that is in contact with at least three of front wheels 11 and rear wheels 12, and directing toward the rotation center shaft of the front wheel 11 and the rear wheel 12 from the contact plane. The downward direction is a direction toward the contact plane from the rotation center shaft of the front wheel 11 and the rear wheel 12. The axis in the longitudinal direction of the body 10, and passing through the center of the widthwise direction of the body 10 is referred to as a longitudinal axis, and an axis orthogonal to the longitudinal axis, and in the lateral direction of the body 10 is referred to as a lateral axis. The axis in the vertical direction of the body 10 is referred to as a vertical axis. The vertical axis is orthogonal to both the longitudinal axis and the lateral axis. In the description below, a planar view is supposed to be viewed from above.

<Overall Structure of Battery Powered Forklift 1>

The battery powered forklift 1 has respective front wheels 11 on front corners of the body 10, and respective rear wheels 12 on rear corners of the body 10. The battery powered forklift 1 travels, when a driving electric motor 50 provided posterior to the front wheel 11 drives the front wheels 11. More specifically, the output from the driving electric motor 50 is transmitted to both front wheels 11 and 11 via a power transmission device 51 having a deceleration function, in order to drive the front wheels 11 and 11.

The fork 13 is provided on the front of the body 10 in order to load and unload a cargo or move the cargo. The fork 13 is supported by a mast 14 provided along the vertical direction. The fork 13 moves up and down along the mast 14 by a drive of a mast cylinder 15 provided with the mast 14. Although not clearly illustrated in the figure, the mast 14 is attached to the body 10 so as to be capable of swinging about a lateral axis on its lower end. The mast 14 has a tilt cylinder, not illustrated, between the body 10. The mast 14 can take a forward tilting posture and a backward tilting posture with respect to the body 10 by the drive of the tilt cylinder.

A counter weight 20 is provided on the rear end of the body 10. As described above, the battery powered forklift 1 is a counter balance forklift in the present embodiment. However, the type of the battery powered forklift 1 is not limited thereto, and it may be a reach forklift, for example. The counter weight 20 is a weight for keeping the balance when the fork 13 holds the cargo. A metal is used for the counter weight 20, but the material is not limited thereto. The counter weight 20 is provided on the portion of the body 10 ranging from the portion above the rear wheel 12 to the rear end.

Figure 4:
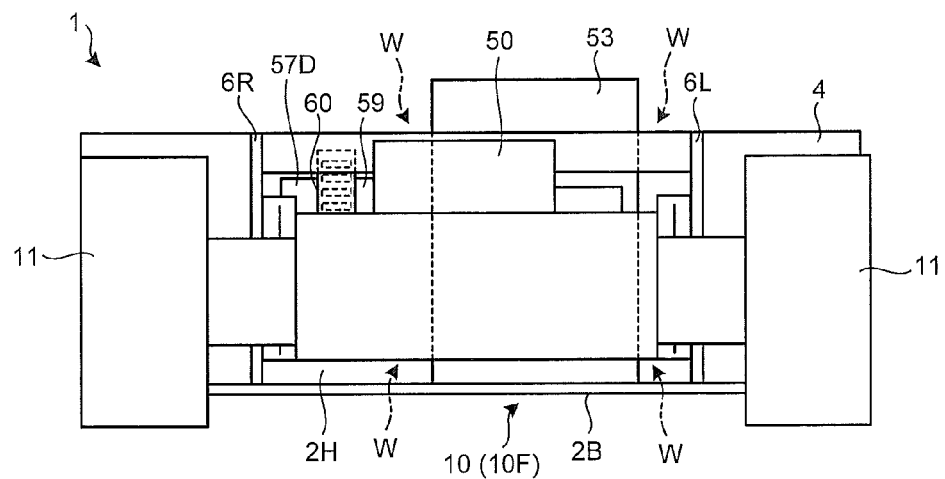
FIG. 4 is a front view of a body viewed from front.
Figure 5:
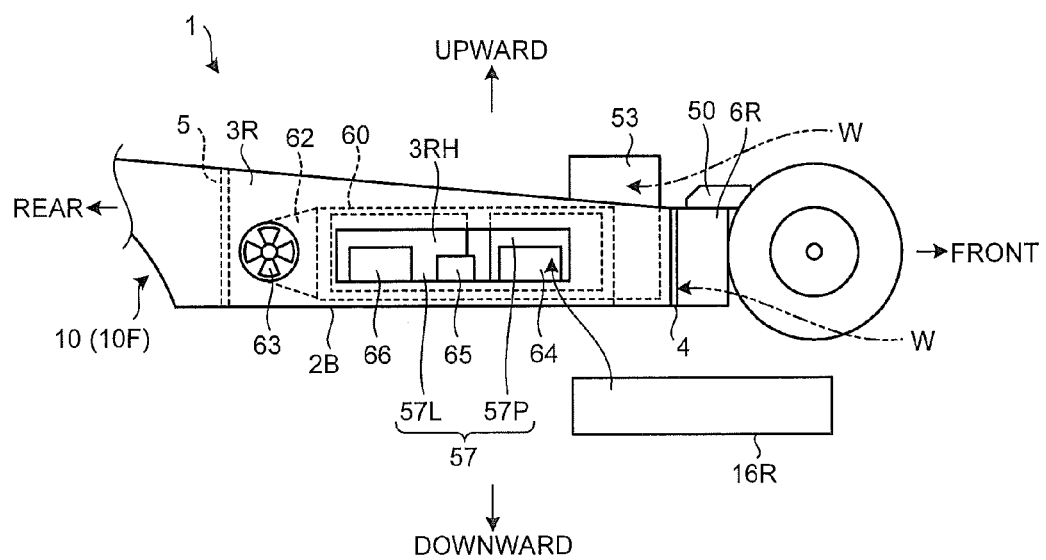
FIG. 5 is a side view of the body viewed from right.

As illustrated in FIG. 2, the counter weight 20 has a concave portion, open in the longitudinal direction, on the top surface. Specifically, the counter weight 20 having the concave portion on its top surface is configured such that a pair of columnar members 22 is formed to project upward on both sides of a weight body 21 having a flat top surface. The columnar members 22 are projecting portions projecting upward and to the front of the body 10 from the portions, opposite to each other, on both sides of the weight body 21, and having guide surfaces 22a that are parallel to each other along the longitudinal direction of the body 10. The columnar members 22 are formed integral with the weight body 21. FIGS. 4 and 5 illustrate a resin weight cover 23 that covers the back surface of the counter weight 20.

As illustrated in FIG. 1, a battery 30 serving as a power supply is mounted on the central part of the body 10. The battery 30 is an open type in which plural battery cells are stored in a battery case 31 having a rectangular solid shape with the top surface open, and the battery cells are open. The battery 30 is not limited to the open type described above, and it may be an easy-maintenance battery. The battery case 31 is formed such that the size along the widthwise direction of the body 10 is set to be slightly smaller than the distance between the pair of columnar members 22, whereby the battery case 31 can pass between the pair of columnar members 22. As illustrated in FIG. 1, the battery 30 is placed onto a battery setting surface 24 formed on the body 10 to be anterior to a front surface 21F of the weight body 21 and below a top surface 21a of the weight body 21. The battery setting surface 24 is set such that, when the battery 30 is mounted, the upper part of the battery 30 on the rear end is present between the columnar members 22, and is overlapped with the counter weight 20.

A battery hood 33 is provided above the battery 30 placed onto the battery setting surface 24, and the driver seat 34 is arranged on the top surface of the battery hood 33. The battery hood 33 has a size large enough for covering the top surface of the battery case 31, and is supported to a support bracket 35 of the body 10 on its front end via a support shaft 33a along the lateral direction of the body 10. The support bracket 35 supporting the battery hood 33 is formed to erect upward from the position on the front end of the battery setting surface 24. The battery hood 33 is movable by the rotation about the support shaft 33a between a horizontal position where the battery hood 33 covers the battery 30 from above and a forward tilting position where the rear end of the battery hood is flipped up to open the battery 30.

In order to exchange the battery 30, the battery hood 33 is moved to be on the forward tilting position by which the portion above the battery 30 is open. With this state, the battery 30 is lifted up above the body 10, pulled out backward, and extracted. The charged battery 30 is hung down, and with this state, moved to the portion above the battery setting surface 24 from the rear of the body 10, and mounted on the battery setting surface 24.

As illustrated in FIG. 1, a top plate 40 is provided above the body 10. As illustrated in FIG. 2, the top plate 40 has plural bars 42 arranged on an approximately rectangular frame body 41 with a size for covering the driver seat 34 from above. The size of the top plate 40 along the widthwise direction of the body 10 is smaller than the body 10. The top plate 40 is attached to the body 10 via a pair of front stays 43 and a pair of rear stays 44.

As illustrated in FIG. 1, the front stays 43 extend downward from the front corner of the top plate 40 so as to tilt forward, and each lower end is fixed to the front end of the body 10. The distance between the front stays 43 is approximately equal along the entire length. Each of the rear stays 44 has an expanding portion 44a that linearly projects downward from the rear corner of the top plate 40, the expanding portions 44a being formed to separate from each other toward the side, and a stay body 44b that extends almost downward in the vertical direction from the lower end of the expanding portion 44a and is fixed to the rear end of the body 10 on its lower end.

The distance between the stay bodies 44b, parallel to each other, of the rear stays 44 is almost the same as the distance between the columnar members 22, whereby the battery case 31 and the battery hood 33 can pass between the stay bodies 44b. The position where the stay body 44b and expanding portion 44a cross each other is set as high as possible in order not to interfere with the rear stay 44 even when the battery hood 33 on the horizontal position is moved to the forward tilting position, and in order not to interfere with the battery case 31 even when the battery 30 is moved to the battery transfer position.

As illustrated in FIG. 1, a storage space 2 is provided in the body 10 below a bottom 30B of the battery 30 and above a bottom 2B of the body 10. In the storage space 2, a cargo-handling electric motor 52 and an operating oil tank 53 are stored. The cargo-handling electric motor 52 generates power for allowing the operating oil, which operates the fork 13, to generate oil pressure. The operating oil tank 53 stores operating oil therein.

The cargo-handling electric motor 52 and the driving electric motor 50 are controlled by the control device. In order to exchange the battery 30 in the battery powered forklift 1, the battery 30 is lifted up, and moved backward. The driver seat 34 is provided above the battery 30 in the battery powered forklift 1. Therefore, the control device cannot be arranged above and posterior to the battery 30 in the battery powered forklift 1, which means the arrangement of the control device is limited. In the battery-powered forklift of counter balance type, in particular, the arrangement of the control device is further limited, since not only the battery 30 but also the counter weight are mounted on the body. In the present embodiment, the above-mentioned control device is stored together with the cargo-handling electric motor 52 and the operating oil tank 53 in the storage space 2 below the battery 30. With this structure, the limited storage space in the battery powered forklift 1 having a counter weight can effectively be used. The arrangement of the control device, the cargo-handling electric motor 52, and the operating oil tank 53 in the storage space 2 will be described later.

In the present embodiment, a charging device 54 for charging the battery 30 is further stored in the storage space 2. When the above-mentioned easy-maintenance battery is used as the battery 30, the charging device 54 is a battery controller having not only a charging function but also a function of monitoring the state of the battery 30. An access door 16L for exchanging a fuse 55 of the charging device 54 or checking the charging device 54 is provided on the side face (on the left side face in FIGS. 1 and 2) of the body 10. Although not illustrated in FIGS. 1 and 2, an access door used for checking equipment (in the present embodiment, the control device described above) provided on the right side in the storage space 2 is also provided on the right side face of the body 10.

In the present embodiment, the control device serving as a device (heat generator) generating heat is stored in the storage space 2 in addition to the device (heat generator), generating heat, such as the cargo-handling electric motor 52 and the operating oil tank 53. This is because, in the counter balance battery powered forklift 1, the control device is arranged in the storage space 2, not above the battery 30, in consideration of the exchange of the battery 30. As a result, the storage space 2 has an environment in which temperature is likely to rise. Therefore, the body 10 includes a fan 56 for discharging air in the storage space 2 to the outside. Since the fan 56 discharges the air in the storage space 2 to the outside, the excessive temperature rise in the storage space 2 can be prevented. By virtue of this structure, in the battery powered forklift 1 of counter balance type having limitation in the arrangement of the devices represented by the control device, the control device can be stored in the body 10, and the excessive temperature rise of the control device, the cargo-handling electric motor 52, the operating oil tank 53 and the like can be prevented.

The battery powered forklift 1 performs a cargo handling operation with the state in which the battery 30 placed onto the battery setting surface 24 is covered by the battery hood 33, and the back surface of the counter weight 20 is covered by the weight cover 23 illustrated in FIG. 2. Specifically, the operator seated on the driver seat 34 operates to drive the battery powered forklift 1 with the front wheels 11 driven by the driving electric motor 50, and moves the fork 13 up and down, as needed, thereby being capable of carrying out the desired cargo handling operation.

In the battery powered forklift 1, a part of the battery 30 is located on the rear beyond the rear stays 44 supporting the top plate 40, and overlapped with the counter weight 20 on the body 10. Accordingly, the mass of the battery 30 effectively functions as the balance weight, so that the mass of the counter weight 20 can significantly be reduced. As a result, the mass of the body 10 is reduced, whereby energy saving, such as reduction in power consumption of the battery 30, can be realized.

Since the battery 30 is mounted on the position above the rear wheels 12 in the battery powered forklift 1, the size of the battery 30 in the widthwise direction can be secured to be large. Accordingly, even when the battery 30 having the same mass is mounted, the size of the battery 30 in the longitudinal direction becomes small, whereby the battery 30 can be arranged more to the rear of the body 10. Consequently, the battery 30 can more effectively be used as the balance weight in the battery powered forklift 1. Next, the arrangement of the devices in the storage space 2 will be described in more detail.

<Arrangement of Devices in Storage Space 2>

Figure 3:
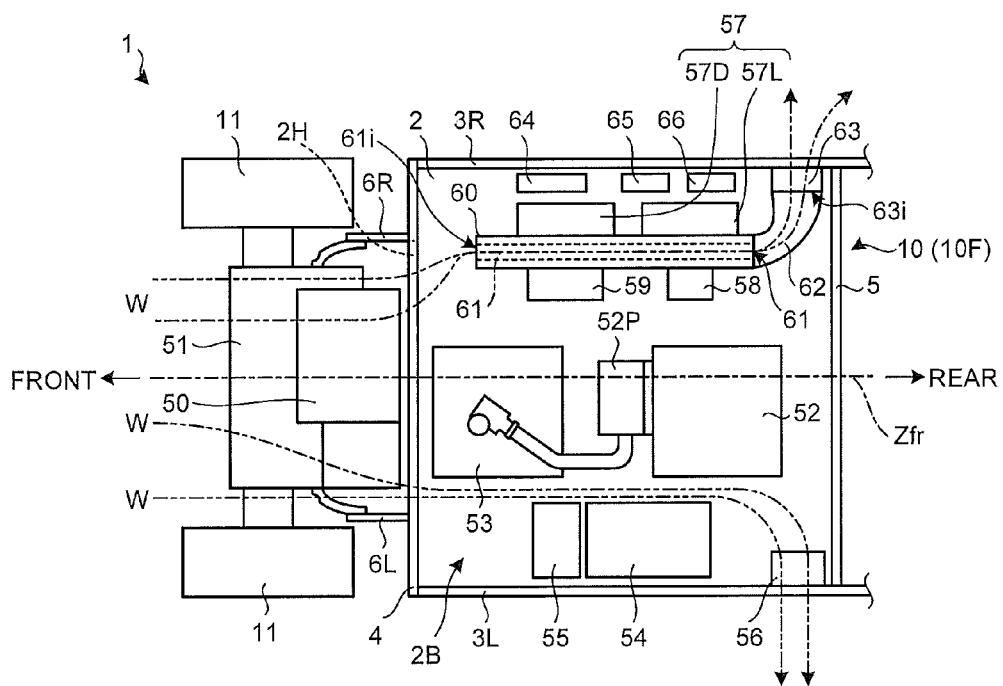
FIG. 3 is a plan view of a storage space in which devices are stored.
Figure 6:
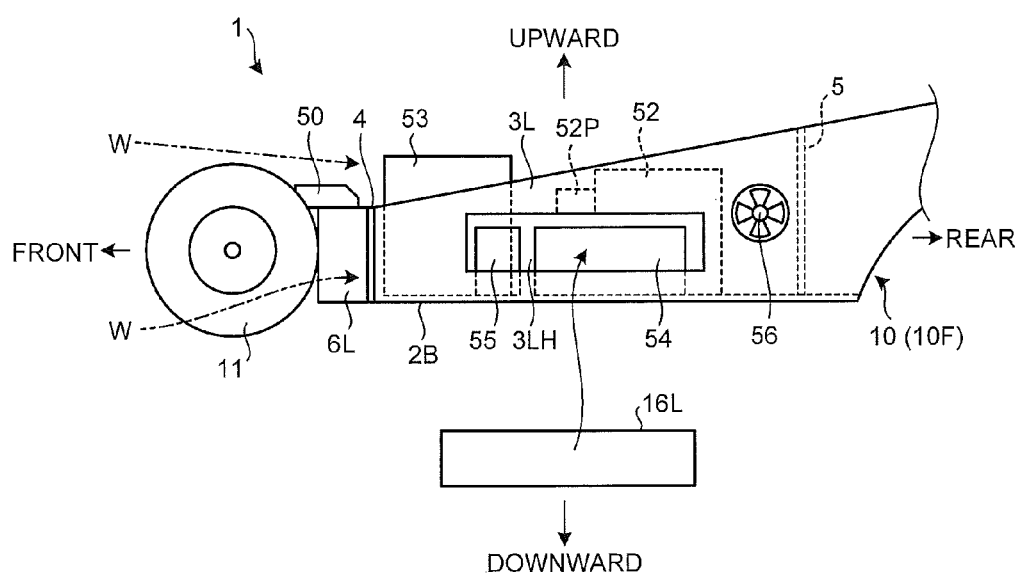
FIG. 6 is a side view of the body viewed from left.

FIG. 3 is a plan view of the storage space in which devices are stored. FIG. 4 is a front view of the body viewed from front. FIG. 5 is a side view of the body viewed from right. FIG. 6 is a side view of the body viewed from left. FIGS. 3 to 6 illustrate the forklift from which the structures present above the storage space 2, such as the driver seat 34, the support bracket 35, and the battery 30 illustrated in FIGS. 1 and 2, are removed.

The storage space 2 is a space enclosed by the bottom 2B, a pair of sides 3L and 3R erecting from the bottom 2B, a front partition 4 provided on the front of the body 10, and a rear partition 5 provided on the rear of the body 10. The bottom 2B, the sides 3L and 3R, the front partition 4, and the rear partition 5 are plate-like members. These members are combined and bonded by welding, whereby a frame 10F of the body 10 is formed, for example. The bottom 2B is a member having an approximately rectangular shape (including a square) in the planar view. The sides 3L and 3R, the front partition 4, and the rear partition 5 are provided along four sides of the bottom 2B. Therefore, the storage space 2 has the approximately rectangular shape (including a square) in the planar view.

The sides 3L and 3R, the front partition 4, and the rear partition 5 are provided to erect from the bottom 2B, i.e., to stand from the bottom 2B. Specifically, the sides 3L and 3R, the front partition 4, and the rear partition 5 are provided to have a predetermined angle (in the present embodiment, almost 90 degrees) with the bottom 2B. The side 3L is provided on the left of the body 10, while the side 3R is provided on the right of the body 10. The side 3L and the side 3R are opposite to each other across a longitudinal shaft Zfr. The side 3L is referred to as the left side 3L, while the side 3R is referred to as the right side 3R, if the sides 3L and 3R have to be distinguished.

The front partition 4 is a partition wall between the front part of the body 10 and the storage space 2, while the rear partition 5 is a partition wall between the rear part of the body 10 and the storage space 2. The left side 3L is a partition wall between the left part of the body 10 and the storage space 2, while the right side 3R is a partition wall between the right part of the body 10 and the storage space 2. It is only necessary that the frame 10F has at least the bottom 2B and a pair of sides 3L and 3R, and the frame is not limited to that having the above-mentioned structure.

The power transmission device 51 that is formed integral with the driving electric motor 50 is attached to the front partition 4 via a pair of support members 6L and 6R. The right and left front wheels 11 and 11 are attached to the power transmission device 51. In the present embodiment, the left and right front wheels 11 and 11 are arranged at the outside of the respective support members 6L and 6R in the widthwise direction. In the present embodiment, the support members 6L and 6R are plate-like members extending in the vertical direction at the front of the frame 10F. The pair of support members 6L and 6R sandwiches the driving electric motor 50 and the power transmission device 51 from both sides for supporting the same, and couples these devices with the frame 10F.

In the present embodiment, the cargo-handling electric motor 52 for driving an oil pump 52P, the operating oil tank 53, the charging device 54, the fuse 55 of the charging device 54, a control device 57, electronic components 58 and 59, a heat sink 60 serving as a radiator, a relay storage case 64 storing various relays, and fuses 65 and 66 of the control device 57 are stored in the storage space 2. The cargo-handling electric motor 52 and the operating oil tank 53 are arranged along the longitudinal direction of the body 10. The control device 57 and the charging device 54 are arranged on both sides of the body 10 in the widthwise direction. In the present embodiment, the cargo-handling electric motor 52 and the operating oil tank 53 are arranged to include a virtual straight line extending in the longitudinal direction on the center of the body 10 in the widthwise direction, i.e., the longitudinal axis Zfr, in the projected view from above the body 10. Since the cargo-handling electric motor 52 and the operating oil tank 53, which have a large mass, are collectively arranged on the center in the widthwise direction of the body 10, and the charging device 54 and the control device 57 are respectively arranged on both sides in the widthwise direction, the mass unbalance between left and right of the body 10 can be prevented.

In the battery powered forklift 1, the control device 57 is stored in the storage space 2 below the battery 30 together with the cargo-handling electric motor 52, the operating oil tank 53, the charging device 54, various relays, and the like. Therefore, the wiring between the control device 57 and the cargo-handling electric motor 52 and the wiring between the control device 57 and the driving electric motor 50 can be decreased, and the degree of freedom in the layout of the wiring is enhanced. The same applies to the wiring between the control device 57 and various relays. Since the control device 57 and the charging device 54 are stored in the storage space 2 provided below the battery 30, the wiring between these devices and the battery 30 can be decreased, and the degree of freedom in the layout of the wiring is enhanced. As described above, in the battery powered forklift 1, the devices such as the control device 57 and the cargo-handling electric motor 52 are collectively stored in the storage space 2 below the battery 30. Therefore, the battery powered forklift 1 has an advantage of decreasing the wiring, and enhancing degree of freedom in the layout of the wiring.

Since the control device 57 is stored below the battery 30, the control device 57 does not hinder the movement of the battery 30 that is moved backward after being lifted up. As described above, the control device 57 is provided on the portion out of the way of the exchange of the battery in the present embodiment.

As illustrated in FIGS. 3 and 4, the storage space 2 has an opening 2H on its front. In the present embodiment, the operating oil tank 53 is arranged anterior to the cargo-handling electric motor 52 on the body 10. With this structure, the operating oil tank 53 having large amount of heat generation is cooled, since air W flowing into the storage space 2 from the opening 2H first collides against the operating oil tank 53. As a result, the operating oil tank 53 can efficiently be cooled by the arrangement of the devices as described above.

In the present embodiment, fans 56 and 63 for exhausting the inside air are provided in the storage space 2. The fan 56 is provided on the left of the body 10, while the fan 63 is provided on the right of the body. In the present embodiment, the fan 56 is attached to the left side 3L, while the fan 63 is attached to the right side 3R. As described above, the fans 56 and 63 are provided at least one on each side of the body 10 in the widthwise direction. In the present embodiment, each of the fans 56 and 63 is provided on each side of the body 10. However, two fans may be provided on the right side or on the left side of the body 10, for example.

The fans 56 and 63 exhaust air in the storage space 2 toward both sides of the body 10 in the widthwise direction, thereby being capable of preventing the cooling unbalance of the devices stored in the storage space 2. The fans 56 and 63 are preferably arranged to be close to the front part or to the rear part of the storage space 2. This structure can form the flow of the air W all over the longitudinal direction of the storage space 2, whereby the devices stored in the storage space 2 can efficiently be cooled. When the fans 56 and 63 are not used, many openings have to be formed on the body 10 in order to exhaust the air having increased temperature in the storage space 2. When there are many openings, water is easy to enter the storage space 2, which might affect the devices having relatively low resistance to water, such as the control device 57 and the cargo-handling electric motor 52. In the present embodiment, the air in the storage space 2 is exhausted by the fans 56 and 63, so that the number of the openings in the storage space 2 can be minimized. The fans 56 and 63 can prevent the water intrusion. Since the possibility of the water intrusion into the storage space 2 can be reduced, this structure is preferable for the devices having relatively low resistance to water, such as the control device 57 and the cargo-handling electric motor 52.

As described above, the storage space 2 has the opening 2H on its front. On the other hand, the back of the storage space 2 is partitioned by the rear partition 5. Therefore, the air W is easy to flow into the storage space 2 from the opening 2H on the front of the storage space 2. In the present embodiment, the devices stored in the storage space 2 are cooled by using the air W from the front opening 2H of the storage space 2 and the air W from above the front partition 4. Therefore, the fans 56 and 63 are both provided on the rear of the storage space 2. Specifically, the fans 56 and 63 are provided posterior to the control device 57 or the charging device 54 and anterior to the rear partition 5.

With this structure, the air W from front of the body 10 passes above and below the driving electric motor 50 and the power transmission device 51 and flows into the storage space 2 from the opening 2H and from above the front partition 4 as arrows indicated by two-dot-chain lines in FIGS. 3 to 6. The air W flowing into the storage space 2 flows toward the rear from the front in the storage space 2, is separated from each other in front of the rear partition 5, and is exhausted to the outside by the respective fans 56 and 63. As described above, the fans 56 and 63 forms the flow of the air W such that the air W, which is taken from the front opening 2H of the storage space 2 and from above the front partition 4, is flown toward rear from front, is separated from each other in front of the rear partition 5, and is exhausted to the outside of the storage space 2. As a result, the fans 56 and 63 can flow the air W taken from front of the body 10 all over the storage space 2, thereby being capable of efficiently cooling the devices stored in the storage space 2.

In the present embodiment, the cargo-handling electric motor 52 and the operating oil tank 53 are arranged along the longitudinal direction of the body 10, and the control device 57 and the charging device 54 are arranged on both sides of the body 10 in the widthwise direction. The arrangement of the devices described above brings an advantage of allowing the fans 56 and 63 to easily form the above-mentioned flow of the air W by using the space between the cargo-handling electric motor 52 and the operating oil tank 53, and the control device 57, and the space between the cargo-handling electric motor 52 and the operating oil tank 53, and the charging device 54.

As illustrated in FIG. 4, the driving electric motor 50 and the power transmission device 51 are arranged in front of the opening 2H of the storage space 2 in the present embodiment. The fork 13 and the mast 14 illustrated in FIG. 1 are attached to front of these devices. Therefore, even if liquid such as water is poured from front of the body 10, the intrusion of the liquid into the opening 2H can be prevented by the fork 13, the mast 14, the driving electric motor 50, and the power transmission device 51.

As illustrated in FIGS. 3 and 4, the opening 2H of the storage space 2 is provided between a pair of plate-like support members 6L and 6R provided on both sides of the front partition 4 in the widthwise direction. The pair of support members 6L and 6R provided on both sides of the opening 2H can prevent the air W from front of the body 10 from flowing toward the frame 10F, more specifically, toward left and right of the front partition 4. As a result, the opening 2H can efficiently take the air W from front of the body 10 into the storage space 2, whereby the cooling efficiency of the devices stored in the storage space 2 is enhanced.

In the present embodiment, the control device 57 includes a driving control device 57D for controlling the driving electric motor 50 as a first control device and a cargo-handling control device 57L for controlling the cargo-handling electric motor 52 as a second control device. These devices are attached to one surface of the heat sink 60 that is a plate-like structure. The electronic components 58 and 59 are attached to the other surface of the heat sink 60. The electronic component 58 is a DC/DC converter, for example, and the electronic component 59 is a contactor, for example.

The control device 57 is attached to the heat sink 60 so as to face the outside of the body 10, i.e., so as to face the outside in the widthwise direction, in the present embodiment. The control device 57 is provided near the right side 3R in the present embodiment. This structure can allow the control device 57, which is a heat generator, to be provided close to the outside of the body 10 having lower temperature, whereby the temperature rise of the control device 57 can be prevented. The charging device 54 is provided on the position opposite to the outside of the body 10, more specifically, on the position opposite to the left side 3L. This structure can allow the charging device 54 to be mounted close to the outside of the body 10 having lower temperature, whereby the temperature rise of the charging device 54 can be prevented.

The heat sink 60 is provided on the bottom 2B of the body 10. As described above, the control device 57 and the electronic components 58 and 59 are attached to the bottom 2B of the body 10 via the heat sink 60 in the present embodiment. The control device 57 and the electronic components 58 and 59 are heat generators that emit heat when being operated. The heat sink 60 exhausts heat from the control device 57 and the electronic components 58 and 59 into the atmosphere to cool them.

In the present embodiment, the heat sink 60 has an air passage 61 therein. The heat sink 60 causes gas, i.e., the air W in the present embodiment, to pass through the air passage 61, thereby enhancing the cooling efficiency of the control device 57 and the electronic components 58 and 59. The heat sink 60 is formed with an air inlet 61i, facing the front of the storage space 2, i.e., facing the front partition 4, of the air passage 61, and is formed with an air exit 61e, facing the rear of the storage space 2, i.e., facing the rear partition 5, of the air passage 61. In the present embodiment, the air exit 61e and an air inlet 63i of the fan 63 are coupled with a duct 62. The air W is sucked by the fan 63, whereby the air W is forcibly flown into the air passage 61 of the heat sink 60. With this structure, the cooling efficiency of the control device 57 and the electronic components 58 and 59 by the heat sink 60 is enhanced. Since the air W is forcibly flown into the air passage 61, the part that is to be cooled can efficiently be cooled by the cooling structure described above. As a result, even if the control device 57 serving as the heat generator is stored in the same space for the operating oil tank 53 and the cargo-handling electric motor 52, which are also the heat generators, the excessive temperature rise of the control device 57 can be prevented by the cooling structure according to the present embodiment.

In the control device 57 attached to the heat sink 60, the driving control device 57D is arranged on the front of the body 10, while the cargo-handling control device 57L is arranged on the rear. In general, the traveling time is longer than the cargo-handling operation using the fork 13 in the battery powered forklift 1. Therefore, the operating time of the driving control device 57D is longer than the operating time of the cargo-handling control device 57L, so that the amount of heat generation of the driving control device 57D tends to be larger. The front part of the storage space 2 formed with the opening 2H is more advantageous for cooling. The temperature of the air W flowing through the air passage 61 of the heat sink 60 increases toward the flowing direction, i.e., from the air inlet 61i on the front of the body 10 toward the air exit 61e on the rear of the body 10. Therefore, in the battery powered forklift 1, the driving control device 57D whose temperature is easy to rise due to a large amount of heat generation is arranged on the front, in order to prevent the temperature rise of the driving control device 57D.

The electronic components 58 and 59 are attached to the surface of the heat sink 60 reverse to the surface on which the control device 57 is attached to. One (in the present embodiment, the electronic component 58) that is weaker against heat of the electronic components 58 and 59 is preferably attached to the position opposite to the cargo-handling control device 57L that has smaller amount of heat generation than the driving control device 57D. This structure can reduce the influence to the electronic component 58 by heat. The arrangement of the fuses 55, 65 and 66 will next be described.

The fuses 65 and 66 of the control device 57 are provided to be opposite to the right side 3R that is one of the pair of sides 3L and 3R. In the present embodiment, the relay storage case 64 is provided to be opposite to the right side 3R. The fuse 55 of the charging device 54 is provided to be opposite to the left side 3L that is the other one of the pair of sides 3L and 3R. Not the fuses 65, 66, and 55 but a fuse boxes storing these fuses may be provided to be opposite to the right side 3R or the left side 3L.

As illustrated in FIG. 5, the right side 3R is formed with a first opening 3RH on the position opposite to the fuses 65 and 66. As illustrated in FIG. 6, the left side 3L includes a second opening 3LH on the position opposite to the fuse 55. Access doors 16R and 16L are respectively attached to the first opening 3RH and the second opening 3LH to inhibit the water intrusion, when the maintenance process, the checking process, and the exchanging process are not carried out.

Since the control device 57 and the charging device 54 are arranged on the bottom 2B of the body 10 in the battery powered forklift 1, the maintenance process, the checking process, and the exchanging process for the fuses 65, 66, and 55 might be difficult. In the present embodiment, the fuses 65 and 66 for the control device 57 are arranged on the position closer to the right side 3R than to the control device 57 and opposite to the first opening 3RH of the right side 3R. The fuse 55 for the charging device 54 is arranged to be adjacent to the charging device 54 and to be opposite to the second opening 3LH of the left side 3L. In the present embodiment, the fuses 65 and 66 are involved with the travel, the cargo-handling operation, and the drive of the battery powered forklift 1, and it is arranged on the right of the battery powered forklift 1. The fuse 55 is involved with the charging of the battery 30, and it is arranged on the left of the battery powered forklift 1.

Since the fuses 65, 66, and 55 are arranged as described above, the fuses 65, 66, and 55 can easily be maintained, checked, and exchanged from the first opening 3RH and the second opening 3LH only by removing the access doors 16R and 16L. The fuses 65 and 66 for the control device 57 are arranged near the control device 57, while the fuse 55 for the charging device 54 is arranged near the charging device 54. Therefore, the wiring between the control device 57 and the fuses 65 and 66, and the wiring between the fuse 55 and the charging device 54 can be decreased, and further, the wiring layout is facilitated. The first opening 3RH and the second opening 3LH for the maintenance process, the checking process, and the exchanging process are formed one on each side of the body 10, which prevents the unnecessary increase in the number of the openings formed on the body 10. Since the possibility of the water intrusion into the storage space 2 can be reduced, this structure is preferable for the devices having relatively low resistance to water, such as the control device 57 and the cargo-handling electric motor 52. The heat sink 60 described above will next be described in more detail.

<Heat Sink 60>

Figure 7:
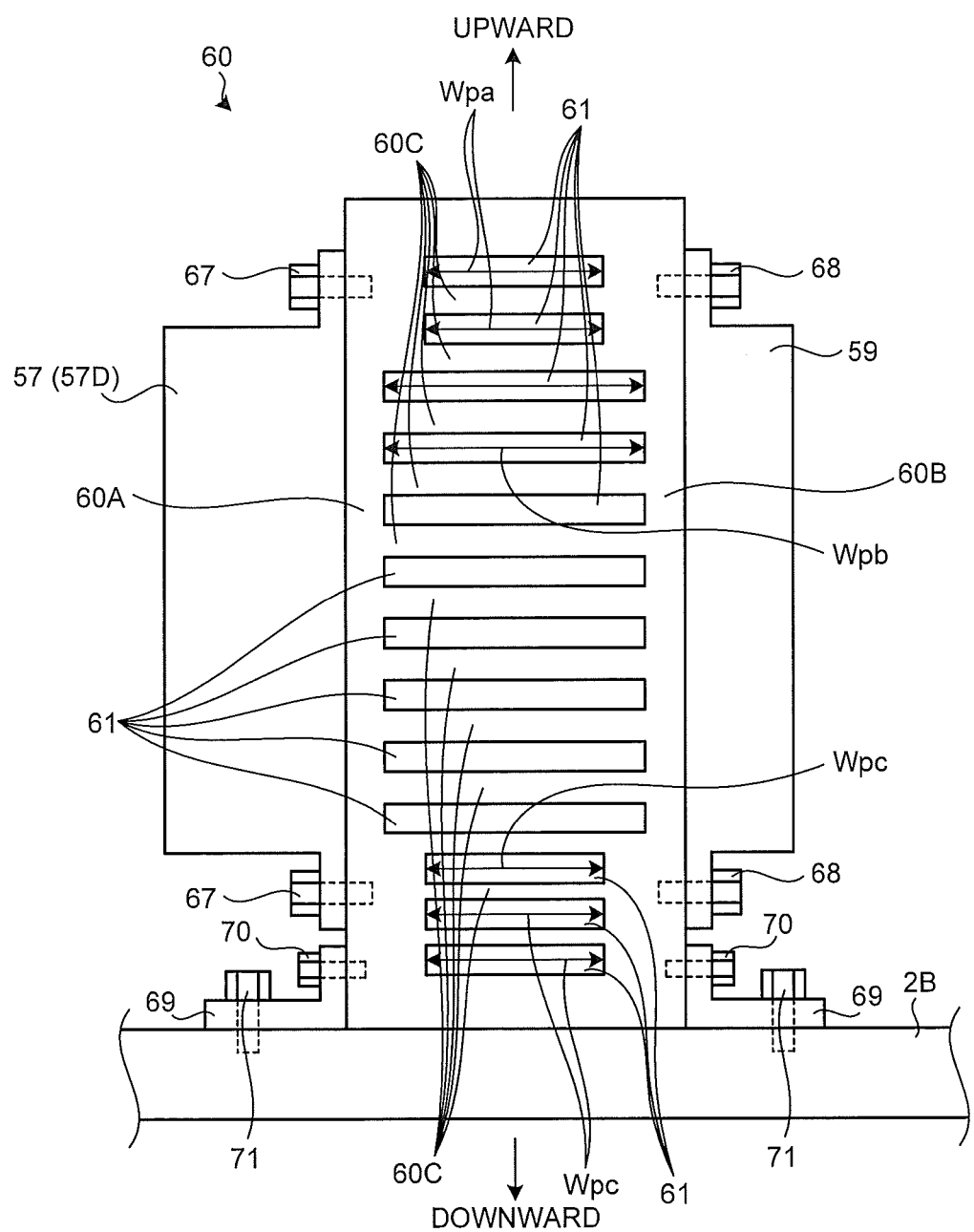
FIG. 7 is a front view of a heat sink according to the embodiment of the present invention.
Figure 8:
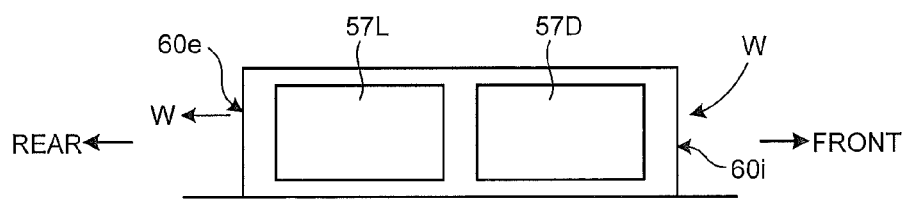
FIG. 8 is a side view of the heat sink according to the embodiment of the present invention.

FIG. 7 is a front view of the heat sink according to the embodiment of the present invention. FIG. 8 is a side view of the heat sink according to the embodiment of the present invention. The heat sink 60 is attached to the control device 57 and the electronic component 59, which are the subjects to be cooled, to discharge heat from them. The heat sink 60 is attached such that an attaching member 69 is attached by a bolt 70. The heat sink 60 is attached to the bottom 2B via the attaching member 69 and a bolt 71. The heat sink 60 includes a first part 60A, a second part 60B arranged opposite to the first part 60A, and plural air passages 61. On the first part 60A, the control device 57 (in the present embodiment, the driving control device 57D) that is the heat generator is attached. On the second part 60B, the heat generator different from the heat generator attached to the first part 60A, i.e., the electronic component 59 in the present embodiment, is attached.

Plural plate-like partition members 60C are arranged between the first part 60A and the second part 60B. The space enclosed by the first part 60A, the adjacent partition member 60C, and the second part 60B becomes the air passage 61. In the present embodiment, the heat sink 60 is made by extrusion molding of aluminum alloy, for example. Therefore, the heat sink 60 is formed such that the first part 60A and the second part 60B are coupled by the plural partition members 60C, and the first part 60A, the second part 60B, and the plural partition members 60C are formed integral. Since the first part 60A, the second part 60B, and the plural partition members 60C are formed integral as described above, the production cost of the heat sink 60 can be reduced.

The heat generator that is the subject to be cooled can be attached to both of the first part 60A and the second part 60B of the heat sink 60. Accordingly, the arrangement space of the heat sink 60 in the body 10 can be made compact, compared to the case in which the heat sink for the control device 57 and the heat sink for the electronic component 59 are attached. Consequently, plural control devices 57 and the electronic component 59 can be cooled by effectively using the storage space 2 below the battery 30 in the battery powered forklift 1 by use of the heat sink 60. As described above, the heat sink 60 is effective for the case in which the plural devices of the battery powered forklift 1 are collectively stored in the storage space 2.

As illustrated in FIG. 8, the heat sink 60 introduces the air W from the air inlet 61i facing front, and cools the driving control device 57D and the cargo-handling control device 57L during when the air W passes through the air passage 61. The air W whose temperature increases due to the cooling of the driving control device 57D and the cargo-handling control device 57L is discharged from the air exit 61e facing rear. The heat sink 60 does not have a gap from the air inlet 61i toward the air exit 61e. Therefore, the heat sink 60 can collect dust from the outside of the storage space 2 into the flow of the air W, whereby the control device 57 and the electronic component 59 can be isolated from outside dust.

The control device 57 is attached to the heat sink 60 by a bolt 67, and the electronic component 59 is attached to the heat sink 60 by a bolt 68. The thickness of the portion, on which the bolts 67 and 68 are screwed, of the first part 60A and the second part 60B (the size from the first part 60A toward the second part 60B) becomes large, in order to secure the depth into which the bolts 67 and 68 are screwed. Therefore, at least two air passages 61 of the heat sink 60 have different size (width) in the direction from the first part 60A toward the second part 60B. Specifically, the widths of the air passages 61 on the portion where the bolts 67 and 68 are screwed on the upper part and the lower part are wpa and wpc, respectively, and the width of each of the air passages 61 between them is wpb. In this case, wpa<wpb, and wpc<wpb. In the present embodiment, wpa=wpc. The width wpa and the width wpc may be different from each other.

The widths wpa and wpc of the air passages 61 on the portions into which the bolts 67 and 68 are screwed are set to be smaller than the width wpc of the air passages 61 on the portions other than the portions into which the bolts 67 and 68 are screwed. Accordingly, the depth into which the bolts 67 and 68 are screwed can be secured, whereby the control device 57 and the electronic component 59 can surely be attached to the heat sink 60. When the thickness of the first part 60A and the thickness of the second part 60B are large, the extrusion molding carried out for producing the heat sink 60 becomes difficult. Therefore, when the thickness of the first part 60A and the thickness of the second part 60B are set to be large in order to secure the depth into which the bolts 67 and 68 are screwed, it becomes difficult to produce the heat sink 60 by the extrusion molding. When the widths of the air passages 61 on the portions where the bolts 67 and 68 are screwed are set to be smaller than the width of each of the air passages 61 on the portions other than the portions where the bolts 67 and 67 are screwed as described above, it is only necessary to locally increase the thickness of the first part 60A and the thickness of the second part 60B. With this structure, the depth into which the bolts 67 and 68 are screwed can be secured, and the heat sink 60 can be produced by the extrusion molding.

Figure 9:
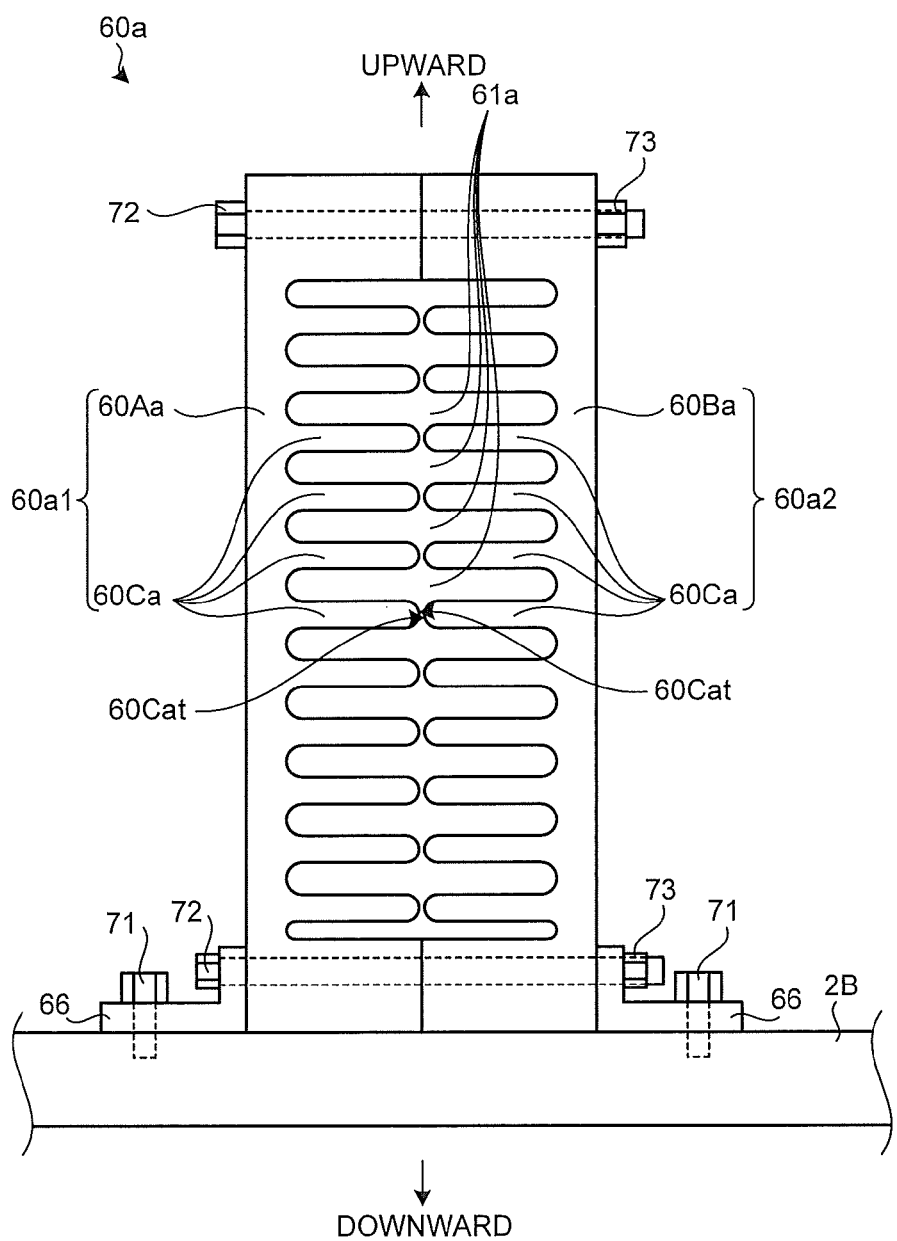
FIG. 9 is a front view of a heat sink according to a modification of the embodiment of the present invention.

FIG. 9 is a front view of a heat sink according to a modification of the embodiment of the present invention. A heat sink 60a includes a first structure 60a1 having plural plate-like members 60Ca on a first part 60Aa, and a second structure 60a2 having plural plate-like members 60Ca on a second part 60Ba. The heat sink 60a is formed such that an end 60Cat of the plate-like member 60Ca of the first structure 60a1 and the end 60Cat of the plate-like member 60Ca of the second structure 60a2 are combined to facing each other.

The first structure 60a1 and the second structure 60a2 are combined to be integral by a bolt 72 and a nut 73. The attaching member 69 is screwed together with the first structure 60a1 and the second structure 60a2 by the bolt 72 and the nut 73 on the lower part. The attaching member 69 is attached to the bottom 2B by the bolt 71. The heat sink 60 is attached to the bottom 2B via the attaching member 69. The space enclosed by the first part 60Aa, the adjacent plate-like member 60Ca on the first part 60Aa, the adjacent plate-like member 60Ca on the second part 60Ba, and the second part 60Ba becomes an air passage 61a.

The heat sink 60a can relatively easily be produced by combining the first structure 60a1 and the second structure 60a2, both of which serve as the heat sink. The above-mentioned heat sink 60 is formed integral by the extrusion molding of the first part 60A, the second part 60B, and the plate-like member 60Ca. Therefore, it is difficult to reduce the thickness of the plate-like member 60Ca to increase its number. However, the plate-like member 60Ca of the heat sink 60a can be formed by using a cutting process, for example. Accordingly, it is relatively easy to reduce the thickness of the plate-like member 60Ca to increase its number in the heat sink 60a, compared to the heat sink 60. Consequently, the heat sink 60a has an advantage of easily increasing the heat-transfer area.

While certain embodiments have been described, these embodiments are not intended to limit the scope of the inventions. Further, it should be noted that components described herein may be replaced with other components that are obvious to those skilled in the art and are substantially equal, i.e., are equivalent. Further, the components described above may be combined on an optional basis. Various omissions, substitutions and changes in the form of the embodiments described herein may be made without departing from the spirit of the embodiments.

REFERENCE SIGNS LIST

1 BATTERY POWERED FORKLIFT
2 STORAGE SPACE
2B BOTTOM
2H OPENING
3L LEFT SIDE (SIDE)
3R RIGHT SIDE (SIDE)
3RH FIRST OPENING
3LH SECOND OPENING
4 FRONT PARTITION
5 REAR PARTITION
6L, 6R SUPPORT MEMBER
10 BODY
10F FRAME
11 FRONT WHEEL
12 REAR WHEEL
13 FORK
14 MAST
16L, 16R ACCESS DOOR
20 COUNTER WEIGHT
23 WEIGHT COVER
24 BATTERY SETTING SURFACE
30 BATTERY
30B BOTTOM
31 BATTERY CASE
50 DRIVING ELECTRIC MOTOR
51 POWER TRANSMISSION DEVICE
52 CARGO-HANDLING ELECTRIC MOTOR
52P OIL PUMP
53 OPERATING OIL TANK
54 CHARGING DEVICE
55, 65, 66 FUSE
56, 63 FAN
57 CONTROL DEVICE
57D DRIVING CONTROL DEVICE
57L CARGO-HANDLING CONTROL DEVICE
58, 59 ELECTRONIC COMPONENT
60, 60a HEAT SINK
60a1 FIRST STRUCTURE
60a2 SECOND STRUCTURE
60C PARTITION MEMBER
60Ca PLATE-LIKE MEMBER
60Cat END
60A, 60Aa FIRST PART
60B, 60Ba SECOND PART
61, 61a AIR PASSAGE
61e AIR EXIT
61i AIR INLET
62 DUCT
63i AIR INLET
64 RELAY STORAGE CASE
67, 68, 70, 71, 72 BOLT
69 ATTACHING MEMBER
73 NUT
Zfr LONGITUDINAL SHAFT

The invention claimed is:
1. A battery-powered work machine driven with a battery, the work machine comprising:
a body including a bottom, a battery setting surface on which the battery is mounted, the battery setting sur- face placed above the bottom, and a pair of sides erecting from the bottom and including a first side and a second side;

a control device of the work machine mounted on the bottom on a side adjacent to the first side, the control device including a driving control device and a cargo-handling control device;

a first fuse for the driving control device, and a second fuse for the cargo-handling control device, the first fuse and the second fuse being provided closer to the first side than the second side;

a charging device for the battery, the charging device being mounted on the bottom on a side adjacent to the second side; and a third fuse for the charging device, the third fuse being provided closer to the second side than the first side; and a storage space that is formed in the body, below a bottom of the battery, and above the bottom of the body, and in which the driving control device is stored, the first fuse for the driving control device, the cargo-handling control device, the second fuse for the cargo-handling device, the charging device, and the third fuse for the charging device in which the first side and the second side are erected on both sides in a widthwise direction of the body, wherein the first side is a partition wall on one of right and left sides of the body, and the second side is a partition wall on the other one of the right and left sides of the body.

2. The battery-powered work machine according to claim 1, wherein
the first side includes a first opening in communication with the first fuse for the driving control device, and a second fuse for the cargo-handling control device, and
the second side includes a second opening in communication with the third fuse for the charging device.

3. A battery-powered forklift including a fork mounted on a front of a body to which a front wheel and a rear wheel are attached, a counterweight provided on a rear of the body, wherein the body travels by a driving electric motor, the forklift comprising:

a battery mounted on a battery setting surface placed above the bottom of the body, and the battery being mounted above the rear wheel;

a storage space that is formed in the body, below a bottom of the battery, and above the bottom of the body, and in which a pair of sides are erected from both sides of the bottom of the body, the pair of sides including a first side and a second side, in a widthwise direction of the body;

a cargo-handling electric motor that is stored in the storage space for allowing operating oil, which operates the fork, to generate oil pressure;

a control device mounted in the storage space on a side adjacent to the first side, the control device including a driving control device to control the driving electric motor and a cargo-handling control device to control the cargo-handling electric motor;

a first fuse for the driving control device, and a second fuse for the cargo-handling control device, the first fuse and the second fuse being stored in the storage space, and are provided closer to the first side than the second side;

a charging device mounted on a side adjacent to the second side in the storage space for charging the battery;

a third fuse for the charging device, the third fuse being stored in the storage space, and provided closer to the second side than the first side; and an operating oil tank for holding the operating oil, wherein said operating oil tank is stored in the storage space, wherein the first side is a partition wall on one of right and left sides of the body, and the second side is a partition wall on the other one of the right and left sides of the body.

4. The battery-powered forklift according to claim 3, wherein
the first side includes a first opening in communication with the first fuse for the driving control device, and a second fuse for the cargo-handling control device, and
the second side includes a second opening in communication with the third fuse for the charging device.

5. The battery-powered forklift according to claim 3, further comprising a fan that exhausts air from the storage space to an outside.

* * * * *